United States Patent [19]

Friemann et al.

[11] 4,366,286

[45] Dec. 28, 1982

[54] COATING AGENT FOR NON-STICK COATINGS

[75] Inventors: Hans Friemann; Hans-Heinrich Moretto; Heinrich Alberts, all of Cologne; Armand de Montigny; Hans Toepsch, both of Leverkusen, all of Fed. Rep. of Germany

[73] Assignee: Bayer Aktiengesellschaft, Leverkusen, Fed. Rep. of Germany

[21] Appl. No.: 204,680

[22] Filed: Nov. 5, 1980

[30] Foreign Application Priority Data

Nov. 28, 1979 [DE] Fed. Rep. of Germany ....... 2947965

[51] Int. Cl.$^3$ .................... C08L 51/08; C08L 83/04
[52] U.S. Cl. .................... 524/588; 525/474; 525/477; 525/478; 525/479
[58] Field of Search .................... 106/287.12; 525/29, 525/474, 477, 478, 479; 260/33.6 SB; 524/588

[56] References Cited

U.S. PATENT DOCUMENTS

| | | | |
|---|---|---|---|
| 3,385,727 | 5/1968 | Thomas et al. | 260/18 S |
| 3,671,485 | 6/1972 | Marwitz et al. | 524/588 |
| 3,821,154 | 6/1974 | Dumoulin et al. | 524/588 |
| 3,872,038 | 3/1975 | Adams et al. | 524/588 |
| 4,049,873 | 9/1977 | Creasey et al. | 106/287.12 |
| 4,248,750 | 2/1981 | Murakami et al. | 524/588 |

FOREIGN PATENT DOCUMENTS 1771128  5/1974  Fed. Rep. of Germany .
2509620  8/1979  Fed. Rep. of Germany .

*Primary Examiner*—Allan Lieberman

*Attorney, Agent, or Firm*—Sprung, Horn, Kramer & Woods

[57] ABSTRACT

In a sheet coated on both surfaces with non-stick coatings, one of the coatings being more non-stick than the other, the improvement which comprises employing as the lesser non-stick coating a composition according to claim 1 by weight consisting essentially of (A) about 10 parts of a polyorganosiloxane with hydroxyl end groups and with a viscosity of $10^2$ to $5.10^4$ Pas, (B) 0.5–5 parts of at least one cross-linking agent of the formula

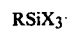

RSiX$_3$· wherein
X is a hydrolyzable group and
R is an alkyl, alkenyl, aryl or aminoalkyl group with 1–12 C atoms, (C) 0.1–2 parts of an organic tin compound as the catalyst and (D) 100–500 parts by weight of an organic solvent, the improvement which comprises additionally including, and (E) 0.1–20 parts of a graft copolymer comprising
   (i) 25–75% of an essentially linear polyorganosiloxane with hydroxyl end groups and with a viscosity of 100 to 500,000 mPas and
   (ii) 10–70% of at least one organic polymer with a molecular weight of 500 to 100,000, linked to (i) via bridges formed on polymerization of
   (iii) 10–60% of one or more monomers containing at least one aliphatic double bond.

6 Claims, No Drawings

COATING AGENT FOR NON-STICK COATINGS

The present invention relates to a coating agent essentially consisting of polyorganosiloxanes (A) with hydroxyl end groups, a graft copolymer (E) of essentially linear polyorganosiloxanes (1) and an organic polymer (2) linked via bridges which are formed between the two polymers (1) and (2) by polymerization of one or more monomers (3) containing at least one aliphatic double bond, one or more crosslinking agents (B) and catalysts (C) which promote crosslinking, the above components being dissolved in organic solvents, and to a process for producing non-stick coatings by application of the coating agent to surfaces which are to be rendered nonstick, an increased peeling force between the adhesive substances and the surfaces to be rendered non-stick being achieved compared with surfaces coated with customary coating agents based on silicone.

It is known that surfaces of paper and other solid materials can be coated with polyorganosiloxanes and that the surfaces thereby become non-stick (compare W. Noll, "Chemie und Technologie der Silicone" ("Chemistry and Technology of Silicones"), Weinheim 1968, pages 520 and 521). U.S. Pat. No. 3,385,727 describes, for example, a composition consisting of a polydiorganosiloxane with hydroxyl end groups, an alkyltriacyloxysilane and an organic tin compound as the catalyst which promotes crosslinking.

From German Auslegeschrift No. 1,771,128, it is known that it is also possible to use graft copolymers of polydimethylsiloxane with an organic chain grafted on for coating surfaces of solid substances. The paper and films coated with these graft copolymers "have very good non-stick properties with regard to adhesives and sticky substances of all types". (Column 7, line 61 et seq.).

However, silicone coatings with a graduated non-stick action are advantageous for various applications. Thus, it is important that the non-stick properties of the two sides of release paper, coated on both sides, between the layers of rolled-up double-sided adhesive tapes should differ. A double-sided tape on which initially only one adhesive layer is exposed when the tape is unrolled can thereby be made available to the user.

Such non-stick coatings with increased peeling forces are described in German Offenlegungsschrift No. 2,509,620, for systems in which the crosslinking is based on the principle of catalytic addition of Si-H onto Si-vinyl groups. The platinum catalysts preferably used for this purpose are employed in very small amounts (up to 50 ppm, relative to the siloxane) and are thus greatly exposed to the danger of becoming poisoned. Thus, for example, brief contact of these systems with sulphur-containing contact rollers of the applicator are sufficient to reduce drastically the activity on hardening. Tin compounds such as occur in the great majority of all coating agents represent another catalyst poison which is to be regarded as serious. Coating machines with which such classical coating agents catalyzed by tin are usually applied can thus in each case be converted for systems catalysed by platinum only after very careful cleaning.

The invention was thus based on the object of providing a coating agent for solid materials which is based on a system, catalysed by tin, of polysiloxanes with hydroxyl end groups and crosslinking agents and which has a weaker non-stick effect than that of the silicone coating agents which were hitherto customary.

A coating agent for solid materials, such as, for example, paper which, after contact with adhesive substances, requires a greater force for peeling the adhesive substances from the substrate than the coating agents which were hitherto customary is thus to be provided.

This object is achieved by replacing some of the polydiorganosiloxane with hydroxyl end groups in a customary silicone coating system consisting of polydiorganosiloxanes with hydroxyl end groups, crosslinking agents and catalysts which promote crosslinking, dissolved in organic solvents, by graft copolymers of a polydiorganosiloxane and an organic polymer linked via bridges which are formed between the two polymers on polymerization of monomers containing aliphatic double bonds.

The present invention thus relates to a coating agent for producing non-stick coatings which have an increased peeling force and essentially consist of
(A) about 10 parts by weight of polyorganosiloxanes with hydroxyl end groups and with a viscosity of about $10^2$ to $5 \times 10^4$ Pa.s,
(B) 0.5–5 parts by weight of one or more crosslinking agents of the formula

wherein
X is a hydrolyzable group and
R is an alkyl, alkenyl, aryl or aminoalkyl group with 1–12 C atoms,
(C) 0.1–2 parts by weight of an organic tin compound as the catalyst and
(D) 100–500 parts by weight of an organic solvent, and which is characterized in that it additionally contains
(E) 0.1–20 parts by weight of a graft copolymer of
1. 25–75 parts by weight of essentially linear polyorganosiloxanes with hydroxyl end groups and with a viscosity of 100 to 500,000 mPa.s and
2. 10–70 parts by weight of one or more organic polymers with a molecular weight of 500 to 100,000, linked via bridges which are formed between the two polymers (1) and (2) on polymerization of
3. 10–60 parts by weight of one or more monomers containing at least one aliphatic double bond, the sum of the parts by weight of 1–3 being 100.

The present invention furthermore relates to a process for producing non-stick coatings with an increased peeling force by application of the coating agent according to the invention.

The polyorganosiloxanes (A) with hydroxyl end groups are essentially linear polydimethylsiloxanes which can also contain minor amounts of phenyl, ethyl or vinyl groups. The crosslinking agent (B) employed in the coating agent according to the invention is methyl-, ethyl- or vinyl-triacetoxysilane, methyltricyclohexylaminosilane or methyltributylaminosilane, preferably a mixture of vinyltriacetoxysilane and cyclohexylaminomethyltriethoxysilane. The catalyst (C) is an organic tin compound of the type

wherein
R' is an alkyl or alkenyl group, such as, for example, butyl, and

X is a hydrolyzable group, preferably acetate, octoate or laurate.

Toluene is usually employed as the solvent (D), but other organic solvents, such as, for example, xylene, benzene, hexane or petroleum ether, can also be used if they are sufficiently highly volatile.

The graft copolymers (E) used according to the invention consist of 1. essentially linear polyorganosiloxanes with hydroxyl end groups, preferably polydimethylsiloxanes, which can contain, in addition to the methyl groups, up to at most 30 mol % of phenyl, ethyl or vinyl groups, and preferably with a viscosity of between 1 and 50 Pa.s,
2. organic polymers, such as polyester, polyether, polyurethane, polyamide, polycarbonate or polyurea, linear polyesters of aliphatic or aromatic dicarboxylic acids, such as adipic acid, sebacic acid, terephthalic acid, phthalic acid, isophthalic acid, malonic acid, maleic acid, fumaric acid, succinic acid, glutaric acid or itaconic acid, and aliphatic or aromatic diols, such as glycol, propane-1,2- and -1,3-diol, butane-1,3- and -1,4-diol, hexane-1,6-diol, 2,2-dimethylpropane-1,3-diol and polyethylene glycols and polypropylene glycols, or polyhydric aliphatic alcohols which contain 2–7 ether atoms in the molecule (compare German Auslegeschrift No. 1,054,620), the various hydroxycresols or hydroxyphenols (compare Ullmanns Enzyclopädie der technischen Chemie (Ullmann's Encyclopedia of Industrial Chemistry), Volume 14, Urban and Schwarzenberg, page 80 et seq., Munich 1963), and polyethers which are prepared in a known manner by polymerization of ethylene oxide and propylene oxide, predominantly being employed, and
3. monomers, for example: olefins such as ethylene, propylene and isobutylene, vinyl esters of aliphatic or aromatic carboxylic acids, preferably vinyl acetate or vinyl propionate, $\alpha,\beta$-unsaturated mono- or di-carboxylic acids and derivatives thereof, such as (meth)acrylic acid, methyl (meth)acrylate, ethyl (meth)acrylate, butyl (meth)acrylate, acrylamide or acrylonitrile, styrene, methylstyrene, 4-chlorostyrene, vinyl chloride, vinylidene chloride or fluoride, vinyl ethers, such as ethyl vinyl ether or butyl vinyl ether, allylacetate or allyl ethyl carbonate. Vinyl acetate or a mixture of styrene and butyl acrylate is preferably employed.

The graft copolymers (E) are prepared by a procedure in which the monomer (3) containing at least one aliphatic double bond is polymerized in the presence of (1) and (2), by agents which form free radicals, such as, for example, butyl peroxide, dicumyl peroxide, dibenzoyl peroxide, tert.-butyl perpivalate or azo-bis-isobutyric acid nitrile, or by UV light.

Surprisingly, as an additive to non-stick coating agents based on polyorganosiloxanes with hydroxyl end groups, one or more crosslinking agents and one or more catalysts which promote crosslinking, the graft copolymers described produce peeling forces between the adhesive substance and the surface treated with the coating agent according to the invention which not only are higher than the peeling forces between the adhesive substance and a surface treated with a coating agent without the addition of graft copolymers, but also do not change over a relatively long storage period.

The invention is illustrated in more detail in the following example wherein the parts in each case relate to parts by weight.

EXAMPLE 1a

Preparation of a graft copolymer of a polydimethylsiloxane, a polyester and vinyl acetate 340 parts of a polydimethylsiloxane with hydroxyl end groups and with a viscosity of 5 Pa.s and 200 parts of a polyester of adipic acid and diethylene glycol which has a OH number of 40 are warmed to 110° C., while stirring vigorously. 200 parts of vinyl acetate and 60.6 parts of a solution of 0.6 part of tert.-butyl perpivalate in 60 parts of a polydimethylsiloxane with hydroxyl end groups and with a viscosity of 5 Pa.s are simultaneously added dropwise from 2 dropping funnels at the above temperature in the course of 2 hours.

After the addition, the mixture is stirred at 110° C. for a further 2 hours and is then warmed to 130° C. and freed from volatile constituents in vacuo. The residue consists of 770 parts of a white composition with a viscosity of 50 Pa.s.

EXAMPLE 1b

Preparation of a graft copolymer of a polydimethylsiloxane, a polyester, styrene and butyl acrylate 300 parts of a polydimethylsiloxane with hydroxyl end groups and with a viscosity of 5 Pa.s and 150 parts of a polyester of adipic acid, butane-1,4-diol and ethylene glycol with a OH number of 55 are warmed to 110° C., while stirring vigorously. 300 parts of a mixture of 200 parts of styrene and 100 parts of butyl acrylate, and 50.6 parts of a mixture of 50 parts of a polydimethylsiloxane with hydroxyl end groups and with a viscosity of 5 Pa.s and 0.6 part of tert.-butyl perpivalate are simultaneously added dropwise from 2 dropping funnels at the above temperature in the course of 2 hours.

After the addition, the mixture is stirred at 100° C. for a further 2 hours and is then warmed to 130° C. and freed from volatile constituents in vacuo. The residue consists of 765 parts of a white composition with a viscosity of 50 Pa.s. Production of coatings on paper

EXAMPLE 1c 7 parts of a polysiloxane with hydroxyl end groups and with a viscosity of $10^3$ Pa.s, 3.5 parts of a graft copolymer from Example 1a, 1 part of vinyltriacetoxysilane, 0.01 part of dibutyl-tin diacetate and 0.3 part of cyclohexylaminomethyltriethoxysilane are dissolved in 300 parts of toluene. The solution is applied onto Kraft paper weighing 75 g/m² by means of a glass doctor blade. The coated paper is heated to 150° C. for 15 seconds.

EXAMPLE 2

7 parts of a polysiloxane with hydroxyl end groups and with a viscosity of $10^3$ Pa.s, 3.5 parts of a graft copolymer from Example 1b, 1 part of vinyltriacetoxysilane, 0.01 part of dibutyl-tin diacetate and 0.3 part of cyclohexylaminomethyltriethoxysilane are dissolved in 300 parts of toluene. This solution is used in the same manner as in Example 1c to coat the same Kraft paper.

EXAMPLE 3 (COMPARISON EXAMPLE)

10 parts of a polysiloxane with hydroxyl end groups and with a viscosity of $10^3$ Pa.s, 1 part of vinyltriacetoxysilane, 0.01 part of dibutyl-tin diacetate and 0.3 part of cyclohexylaminomethyltriethoxysilane are dissolved in 300 parts of toluene. This solution is used in the same manner as in Example 1c to coat the same Kraft paper.

To measure the adhesive action of the coating, strips of adhesive tape (25 mm Tesafilm 104 from Messrs. Beiersdorf AG, Hamburg) are stuck onto the paper. After storage at room temperature for up to 7 days, the adhesive forces are measured by means of a peel tester. (See Table).

| Storage conditions | | Forces: | | |
|---|---|---|---|---|
| Time [d] | Temperature [°C.] | Example 1c $\left[\frac{mN}{cm}\right]$ | Example 2 $\left[\frac{mN}{cm}\right]$ | Example 3 $\left[\frac{mN}{cm}\right]$ |
| 0 | 25 | 0 | 40 | 0 |
| 1 | 25 | 102 | 190 | 0 |
| 1 | 60 | 330 | 620 | 9 |
| 7 | 25 | 176 | 218 | 0 |

EXAMPLE 4

The paper-coating agents prepared (a) according to Example 1c, (b) according to Example 2 and (c) according to Example 3 (comparison example) were applied to Kraft paper on a paper-coating machine and were hardened at 140° C.

A thin, well-hardened film is formed in each case.

The peel strengths were measured with the aid of Tesaband No. 651, 25 mm wide.

| | Example: | | |
|---|---|---|---|
| Time in weeks | 4 a $\left[\frac{mN}{cm}\right]$ | 4 b $\left[\frac{mN}{cm}\right]$ | 4 c $\left[\frac{mN}{cm}\right]$ |
| 1 | 781 | 528 | 215 |
| 4 | 1240 | 597 | 477 |

It will be appreciated that the instant specification and examples are set forth by way of illustration and not limitation, and that various modifications and changes may be made without departing from the spirit and scope of the present invention.

What is claimed is:

1. In a coating composition for producing non-stick coatings which have increased peeling forces and by weight consisting essentially of (A) about 10 parts of a polyorganosiloxane with hydroxyl end groups and with a viscosity of $10^2$ to $5 \times 10^4$ Pas,
   (B) 0.5-5 parts of at least one cross-linking agent of the formula $$RSiX_3$$

wherein
   X is a hydrolyzable group and
   R is an alkyl, alkenyl, aryl or aminoalkyl group with 1-12 C atoms,
   (C) 0.1-2 parts of an organic tin compound as the crosslinking catalyst and
   (D) 100-500 parts by weight of a volatile organic solvent, the improvement which comprises additionally including
   (E) 0.1-20 parts of a graft copolymer comprising
      (i) 25-75% of an essentially linear polyorganosiloxane with hydroxyl end groups and with a viscosity of 100 to 500,000 mPas and
      (ii) 10-70% of at least one organic polymer with a molecular weight of 500 to 100,000, linked to (i) via bridges formed on the free radical polymerization of
      (iii) 10-60% of one or more monomers containing at least one aliphatic double bond, the sum of (i) to (iii) being 100%.

2. A coating agent according to claim 1, wherein the organic polymer (ii) is a polyester.

3. A coating agent according to claim 1, wherein the organic polymer (ii) is a polyether.

4. A coating agent according to claim 1, wherein the monomer containing an aliphatic double bond (iii) is vinyl acetate.

5. A coating agent according to claim 1, wherein the monomers containing an aliphatic double bond (iii) is a mixture of styrene and butyl acrylate.

6. A coating according to claim 1 wherein the crosslinking agent is at least one of methyltriacetoxysilane, ethyl-triacetoxysilane, vinyl-triacetoxysilane, methyltricyclohexylaminosilane or methyltributylaminosilane, and the catalyst is an organic tin compound of the formula $$R_2'SnX_2$$

wherein
R' is an alkyl or alkenyl group, and
X is a hydrolyzable group.

* * * * *